US010782991B2

(12) United States Patent
Fitzgerald et al.

(10) Patent No.: US 10,782,991 B2
(45) Date of Patent: Sep. 22, 2020

(54) CUSTOMIZABLE VIRTUAL MACHINE RETIREMENT IN A MANAGEMENT PLATFORM

(71) Applicant: Red Hat, Inc., Raleigh, NC (US)

(72) Inventors: Florentine Fitzgerald, Kingston, NY (US); Gregory M. McCullough, Kinnelon, NJ (US); Jason W. Frey, Cedar Knolls, NJ (US); Oleg Barenboim, Englewood Cliffs, NJ (US)

(73) Assignee: Red Hat, Inc., Raleigh, NC (US)

( * ) Notice: Subject to any disclaimer, the term of this patent is extended or adjusted under 35 U.S.C. 154(b) by 185 days.

(21) Appl. No.: 15/054,323

(22) Filed: Feb. 26, 2016

(65) Prior Publication Data

US 2017/0249175 A1 Aug. 31, 2017

(51) Int. Cl.
*G06F 9/455* (2018.01)

(52) U.S. Cl.
CPC ........... *G06F 9/45558* (2013.01); *G06F 2009/45562* (2013.01); *G06F 2009/45575* (2013.01)

(58) Field of Classification Search
None
See application file for complete search history.

(56) References Cited

U.S. PATENT DOCUMENTS

| 8,234,641 | B2 | 7/2012 | Fitzgerald et al. | |
|---|---|---|---|---|
| 8,856,319 | B1 * | 10/2014 | Huang | G06F 9/5077 709/224 |
| 9,176,758 | B2 | 11/2015 | Swaminathan | |
| 2007/0234302 | A1 | 10/2007 | Suzuki et al. | |
| 2013/0346618 | A1 * | 12/2013 | Holkkola | H04L 47/70 709/226 |
| 2014/0165060 | A1 | 6/2014 | Muller et al. | |
| 2014/0317616 | A1 | 10/2014 | Chu | |
| 2015/0074536 | A1 | 3/2015 | Varadharajan et al. | |
| 2015/0193251 | A1 | 7/2015 | Chu et al. | |
| 2016/0070597 | A1 * | 3/2016 | Riggin | G06F 9/5011 718/1 |

(Continued)

OTHER PUBLICATIONS

"Edit Virtual Machine Startup and Shutdown Settings", https://pubs.vmware.com/vsphere-4-esx-vcenter/index.jsp?topic=/com.vmware.vsphere.vmadmin.doc_41/vsp_vm_guide/managing_virtual_machines/t_configure_virtual_machine_start_up_and_shut_down_behavior.html, Nov. 26, 2015, 2 pages.

(Continued)

*Primary Examiner* — Wynuel S Aquino
*Assistant Examiner* — Melissa A Headly
(74) *Attorney, Agent, or Firm* — Lowenstein Sandler LLP (57) ABSTRACT

The subject matter of this specification can be implemented in, among other things, a method that includes responsive to occurrence of a virtual machine (VM) retirement event, invoking, by a processing device in a management platform, a VM retirement state machine of the management platform to handle retirement of a VM corresponding to the VM retirement event, setting, via the VM retirement state machine, a VM retirement attribute corresponding to the VM to a retiring state, determining, via the VM retirement state machine, that the VM is in a correct state to retire, performing, via the VM retirement state machine, user-customized pre-retirement processes corresponding to the VM, retiring, via the VM retirement state machine, the VM, and setting, via the VM retirement state machine, the VM retirement attribute to a retired state.

20 Claims, 6 Drawing Sheets

(56) References Cited

U.S. PATENT DOCUMENTS

2017/0192808 A1* 7/2017 Kaufer ............... G06F 9/45558

OTHER PUBLICATIONS

"Virtual Machine Startup and Shutdown Behavior", https://pve.proxmox.com/wiki/Virtual_Machine_Startup_and_Shutdown_Behavior, Nov. 26, 2015, 2 pages.
"Allow Controlled Shutdown of GuestOS for Operations Which Power Off the VM", https://specs.openstack.org/openstack/nova-specs/specs/juno/implemented/user-defined-shutdown.html, Nov. 26, 2015, 4 pages.

* cited by examiner

CUSTOMIZABLE VIRTUAL MACHINE RETIREMENT IN A MANAGEMENT PLATFORM

TECHNICAL FIELD

This disclosure relates to cloud computing resources, and more particularly, to customizable virtual machine retirement in a management platform.

BACKGROUND

Management platforms are integrated products that provide for the management of virtual infrastructure, public cloud environments, private cloud environments, hybrid cloud environments, containers, software-defined networks, software-defined storage, middleware and its applications, and physical data centers (which include many racks each of which has many computers, network devices, and storage devices all interconnected). Management platforms provide scalable self-service interfaces, provision virtual system images, enable metering and billing, and provide workload optimization through established policies.

Management platforms enable environment management tasks on top of a virtual infrastructure. Such management tasks may include, but are not limited to, providing a self-service portal and capabilities for granular permission for user access, metering and billing for chargeback and showback, ability to provision new instances and applications for an application catalog or from image templates, integration points with existing system management, service catalogs, and configuration management software, and an ability to control and automate the placement and provisioning of new instances based on business and security policies.

DETAILED DESCRIPTION

Aspects and implementations of the disclosure are directed to customizable virtual machine (VM) retirement in a management platform. Management platforms are implemented in order to manage the entities that may run in a computing environment. Examples of computing environments may include a virtual infrastructure, public cloud environments, private cloud environments, hybrid cloud environments, containers, software-defined networks, software-defined storage, middleware and its applications, and physical datacenters (which include many racks each of which has many computers, network devices, and storage devices all interconnected).

One example computing environment managed by a management platform may be a cloud computing environment (e.g., public cloud, private cloud, hybrid cloud). A cloud computing environment can include many entities operating in one or both of a non-virtual layer and a virtual layer. The virtual layer can include virtual resources, such as virtual machines (VMs) and containers. A container is an isolated set of resources allocated to executing an application and/or process independent from other applications and/or processes. The non-virtual layer can include physical resources, such as a bare metal system (BMS). A bare metal system is a physical computing machine without virtualization.

Management platforms are implemented in order to manage the many entities that may run in a computing environment. The management platform can provide process integration and adaptive automation for management events and administrative or operational activities of the computing environment, including a virtual infrastructure. Specifically, the management platform is responsible for lifecycle management of VMs, including tasks such as provisioning, customization, reconfiguration, approval, database updates, and retirement (e.g., shutdown and not allowed to restart, unregister the VM from a host and host controller) of VMs.

Aspects of the present disclosure provide a customizable VM retirement process for a management platform. The customizable VM retirement process of implementations is provided as part of a state machine. A state machine may refer to a component that stores the status of something at a given time and can operate on input to change the status and/or cause an action or output to take place for any given change. The state machine construct enables successful completion of a prior step before a next step is run, permits steps to be retried, and allows for a timeout value on the successful completion of a state. A state machine can also cause an action or output to take place for any given changes. State machines are designed so that state 'B' cannot begin until state 'A' completes successfully.

The VM retirement state machine of implementations of the disclosure provides the flexibility to better control and configure actions taken during the VM retirement process managed by a management platform. The VM retirement state machine of implementations of the disclosure can be modified and customizable by copying and extending the VM retirement state machine in a user domain, and provides a consistent tool for controlling a lifecycle of the VM. An additional feature of the VM retirement process described herein is the addition of a retirement state attribute for the retiring VM that enables the management platform to detect when the retirement process starts and finishes, and when an error occurs.

Conventional solutions for providing a VM retirement process by a management platform relied on hidden workflow processing and policy definitions, which significantly limited the usefulness of managing the VM retirement workflow. For example, previous solutions for VM retirement by a management platform would force a shutdown and removal of the VM when retirement was indicated, without providing other options for the user, such as unregistering the VM. In addition, users were not able to customize the VM retirement process to implement user-specific activities around the VM retirement process.

Figure 1:
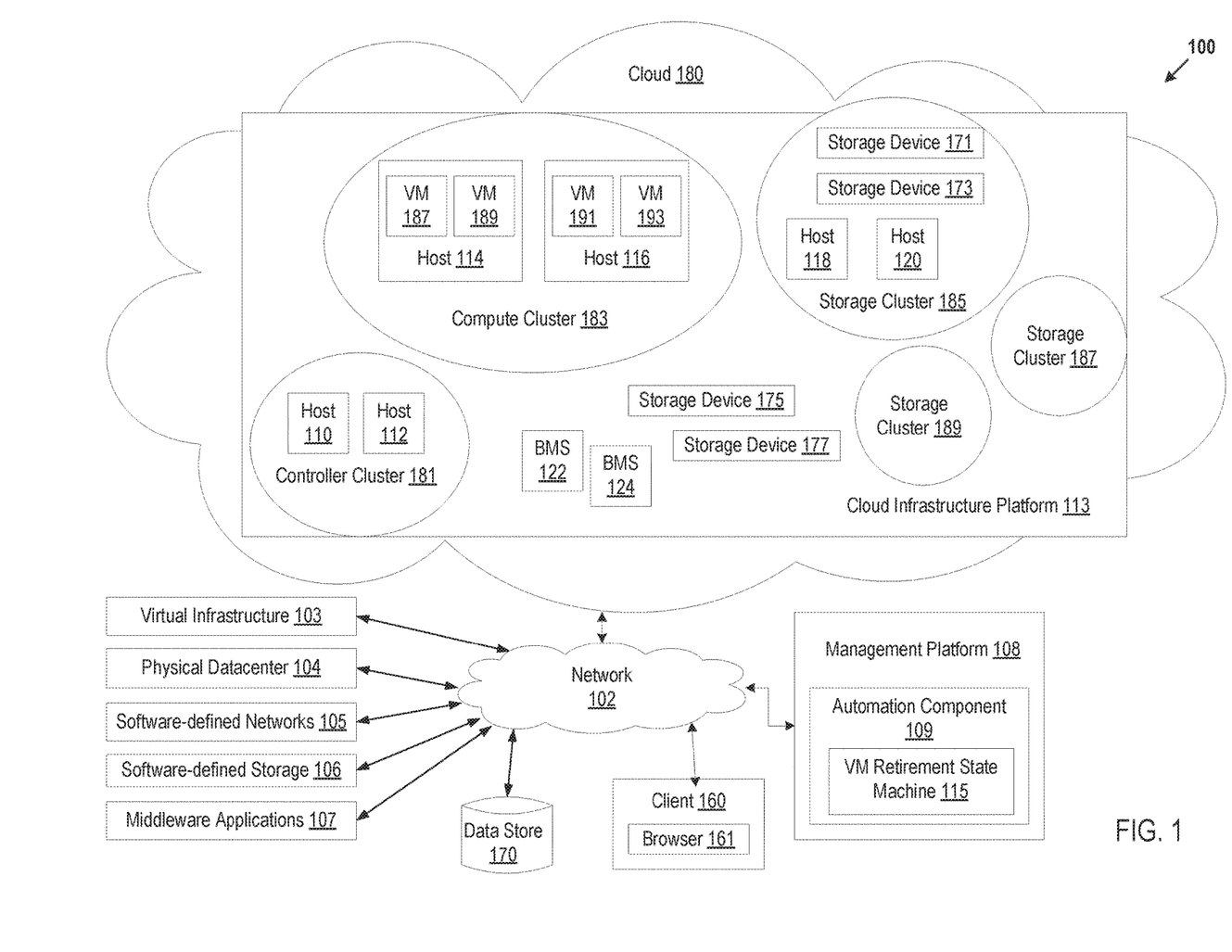
FIG. 1 is a block diagram that shows an example of a network architecture for a management platform computing environment.

FIG. 1 is an example system architecture 100 in which implementations of the present disclosure can be implemented. The system architecture 100 can include one or more different types of computing environments, including but not limited to, virtual infrastructure 103, a physical data center 104, software-defined networks 105, software-defined storage 106, middleware applications 107, and one or more clouds 180. A management platform 108 may manage entities of any of the one or more computing environments 103, 104, 105, 106, 107, 180.

Throughout this document, for brevity and simplicity, cloud 180 is used as an example computing environment that is managed by management platform 108. However, implementations of the disclosure may apply to other computing environments, such as virtual infrastructure 103, physical datacenter 104, software-defined network 105, software-defined storage 106, and/or middleware applications 107, to name a few examples.

Cloud 180 may be a public cloud, a private cloud, or a hybrid cloud. Cloud 180 can provide resources (e.g., compute resources, storage resources, network resources) to an entity. An entity, as referred to herein, can represent any software provider, service provider, a business organization such as a corporation, an educational institution such as a college and university, an individual, etc. For example, several sub-entities may be different departments within the same entity, such as an Enterprise company, and may store and access data in the cloud 180.

As described above, the cloud 180 can include a non-virtual layer and a virtual layer. The virtual layer can include virtual resources, such as VMs 187-193 and containers. The non-virtual layer can include physical resources, such as bare metal systems (e.g., BMS 122-124) and host machines ("host") (e.g., host machines 110-120). Bare metal systems 122,124 are physical computing machines that do not include any software or virtualization. Host machines 110-120 are physical computing machines that do include software (e.g., operating system) and/or virtualization. For example, host machine 114 is the underlying computing hardware used to host VMs 187-189. The underlying hardware (e.g., computing machines) of the physical layer of the cloud 180 can be physically located in one or more data centers for the cloud 180. Individual bare metal systems and hosts can be a server computer system, a desktop computer or any other computing device.

The cloud 180 can provide compute resources, storage resources, and/or network resources to end users. Compute resources can include processing devices, bare metal systems (e.g., BMS 122-124), virtual machines (e.g., VMs 187-193), software containers, host machines 110-120, applications, memory, hypervisors, etc. Storage resources can include, and are not limited to, storage servers, storage software, disks, data stores, etc. Network resources can be virtual network resources.

The infrastructure of the cloud 180 can be implemented by a cloud infrastructure platform 113. An example of a cloud infrastructure platform 113 can include and is not limited to Red Hat® OpenStack®. The cloud infrastructure platform 113 can implement one or more clusters in the cloud 180. Each cluster can be dedicated to performing one or more certain functions. A cluster hereinafter refers to a group of connected hosts that work together for one or more particular functions. The cloud 180 can include a controller cluster 181, a compute cluster 183, and one or more storage clusters 185. The controller cluster 181 can include one or more host machines (e.g., host machines 110,112) for managing networking infrastructure, APIs (application programming interfaces), and communications for the cloud 180.

The compute cluster 183 can include one or more host machines (e.g., host machines 114,116) for hosting virtual machines (e.g., virtual machines 187-193). There can be a large number of virtual machines, containers, and/or containers within virtual machines in the cloud 180. For brevity and simplicity, two virtual machines (e.g., VMs 187-189) hosted by host machine 114 and two virtual machines (e.g., VMs 191-193) hosted by host machine 116 are used as examples in system architecture 100.

The individual storage clusters 185-189 can include one or more hosts and one or more storage devices to manage storage for the data in the cloud 180. For brevity and simplicity, two host machines 118,120 and two storage devices 171,173 are used as examples in system architecture 100. For example, the storage cluster 185 can manage virtual hard drives on storage devices 171,173 for virtual machines 187-193 in the cloud 180. The storage devices 171,173 can create a storage array for storing data in the cloud 180.

The cloud 180 can include one or more types of storage clusters. One type of storage cluster (e.g., storage cluster 185) can manage block storage for virtual disks, for example, for the virtual machines (e.g., VMs 187-193) in the compute cluster 183. Another type of storage cluster (e.g., storage cluster 187) can manage object storage for files. Another type of storage cluster (e.g., storage cluster 189) can manage both block storage and object storage in a single cluster for the virtual machines in the compute cluster.

Users can interact with applications executing on cloud resources, such as VMs 187-193, using client computer systems, such as client 160, via corresponding applications (e.g., web browser program 161). There can be a large number of clients. For brevity and simplicity, client 160 is used as an example in architecture 100. The client 160 can be connected to the one or more hosts 114,116 in a compute cluster 183 via a network 102. The client 160 can be a mobile device, a PDA, a laptop, a desktop computer, or any other computing device.

As discussed above, the cloud infrastructure platform 113 of the cloud 180 can be managed by management platform 108. An example of a management platform 108 can include and is not limited to Red Hat® CloudForms. The cloud infrastructure platform 113 of the cloud 180 can be coupled to the management platform 108 via the network 102, which may be a private network (e.g., a local area network (LAN), a wide area network (WAN), intranet, or other similar private networks) or a public network (e.g., the Internet). Similarly, management platform 108 may connect to other types of computing environments, such as virtual infrastructure 103, a physical data center 130, software-defined networks 140, software-defined storage 150, and middleware applications 160 via network 102. In other implementations, the management platform 108 may directly connect to any of the computing environments 103, 104, 105, 106, 107.

The management platform 108 can be hosted by one or more machines (e.g., server computers, desktop computers, etc.). The management platform 108 may be maintained by a cloud consumer of the cloud 180, such as an Enterprise (e.g., business, company). In another implementation, the management platform 108 may be maintained by a cloud provider. The management platform 108 can be coupled to multiple clouds via one or more networks 102.

In one implementation, management platform 108 manages the lifecycle of resources of a computing environment 103, 104, 105, 106, 107, 180. Resources of the computing environment can include, but are not limited to, bare metal systems, hosts, virtual machines, pods, containers, and containers within VMs, storage devices, storage servers, etc.

The following description discusses the specific resource of a VM, and managing the retirement workflow process for VMs managed by the management platform 108.

In one implementation, management platform 108 includes an automation component 109 with VM retirement state machine 115 to provide a user-customizable VM retirement workflow for managed VMs. In one implementation, the managed VMs may be VMs 187, 189, 191, 193 residing in the cloud 180. However, managed VMs may be implemented in other types of computing environments, such as virtual infrastructure 103, physical datacenter 104, and so on. The automation component 109 and VM retirement state machine 115 make the VM retirement workflow performed by the management platform 108 an easily-modifiable and customizable process.

In one implementation, the VM retirement state machine 115 provides flexibility to modify and customize actions taken during retirement of a VM 187, 189, 191, 193. Previous solutions for managing VM retirement utilized a retirement module that relied heavily on hidden workflow processing and policy definitions, which significantly limited its usefulness. The VM retirement state machine 115 of implementations of the disclosure is described in further detail below with respect to FIG.

Figure 2:
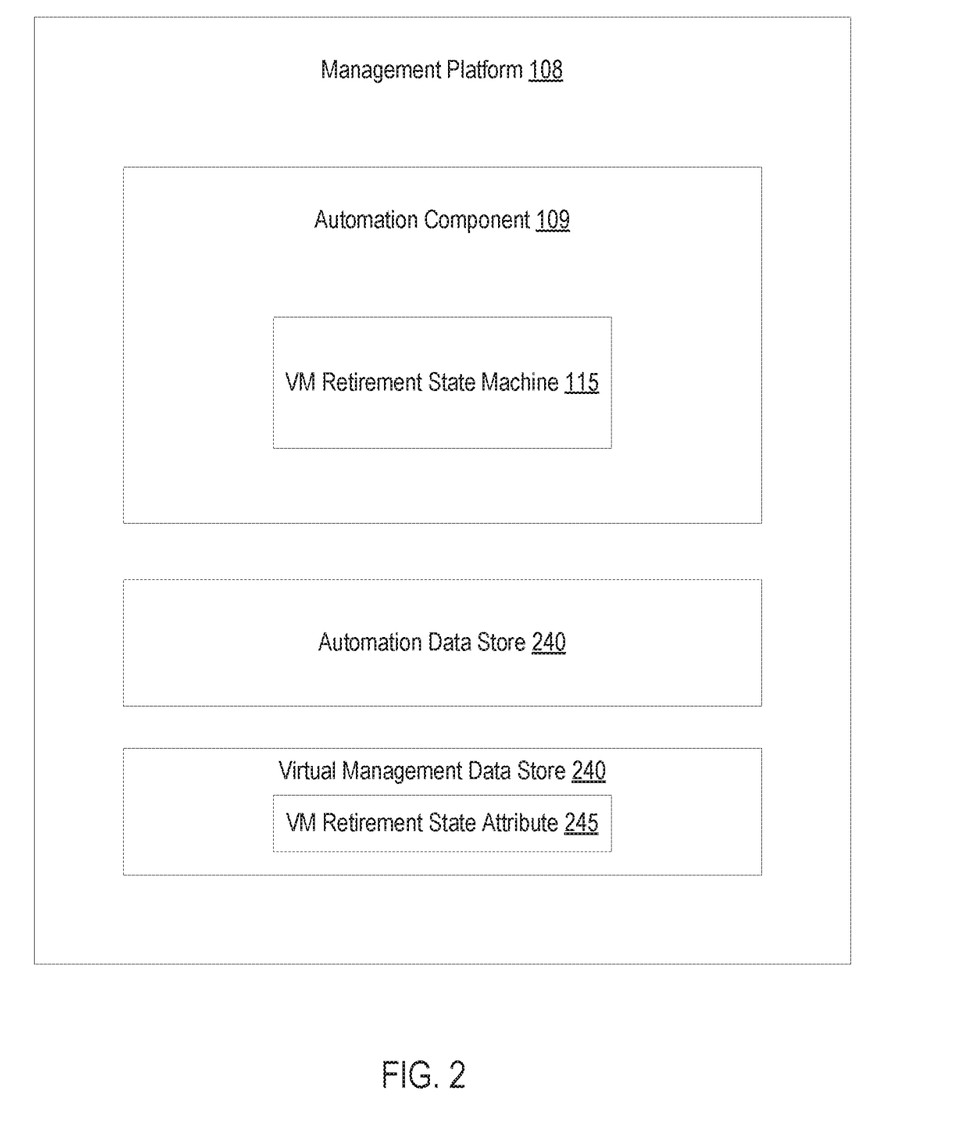
FIG. 2 is a block diagram that shows an example of a management platform architecture.

FIG. 2 is a block diagram of management platform 108 according to implementations of the disclosure. In one implementation, management platform 108 is the same as its counterpart described with respect to FIG. 1. management platform 108 includes an automation component 109, which also may be the same as its counterpart described with respect to FIG. 1. Automation component 109 may include a VM retirement state machine 115. The VM retirement state machine 115 may be the same as its counterpart described with respect to FIG. 1.

The automation component 109 is a collection of functionality that enables bi-directional process integration during execution of the underlying managed components. The automation component 109 further provides users of the management platform 108 with processes to implement adaptive automation for management events and administrative of operational activities. The automation component 109 may be arranged to provide an object-oriented hierarchy to control automation functions. It may include a number of organization units arranged in a hierarchy, such as a data store 240, domains, namespaces, classes, instances, and methods.

The organization unit of the automation data store 240 may refer to the main organizational unit that stores an entire automate model for the automation component 109.

Domains may refer to a collection of automation functions. Functions are executed depending on the order of domain priority, which means a function in a domain with a higher priority overrides the same functions specified in a lower-priority domain. This allows the management platform 108 to specify a core domain, but allow users to override automate functions with custom domains. Each domain contains a set of namespaces.

Namespaces may refer to containers that organize and categorize functions of the automate model. Namespaces can contain child namespaces as well as classes.

Classes may refer to templates for a specific function of the model. Each class uses a schema to apply to instances to populate with default values. The schema may define variables, states, relationships, and methods for an instance of the class. Each class also can contain a set of methods.

Instances refer to a version of a class populated with initial configuration data. An instance can include a collection of any number of attributes, calls to methods, and relationships.

Methods may refer to functions within the model. Each method may be a self-contained block of code that is executed when any automation operation is run. In one implementation, methods use Ruby® code to execute various operations needed for a class.

In one implementation, the automation component 109 may utilize state machines to perform a sequence of operations. As discussed above, a state machine may refer to a component that stores the status of something at a given time and can operate on input to change the status and/or cause an action or output to take place for any given change. The state machines can enable the successful completion of a prior step before the next step is run, permit steps to be retried, and allow for a timeout value on the successful completion of a state. The state machine can also cause an action or output to take place for any given changes. State machines are designed so that state 'B' cannot begin until state 'A' completes successfully.

In some implementations, a state machine of the management platform 108 is a class schema that is constructed with a sequence of states. Each state in the class schema of a state machine includes attributes such as a name, description, and default value, as well as an on entry attribute, on exit attribute, on error attribute, max retries attribute, and max time attribute.

The name and description attributes define the name of the state machine and an explanation of what the state machine is responsible for. The on entry attribute defines a method to run when entering the state. It enables an automate method to do some pre-processing before the state of the state machine is processed. The on exit attribute defines a method to run when exiting the state. The on error attribute defines a method to run if an error is encountered when running the state. It enables an automate method to perform final processing before the state machine finally exits due the error. The default value attribute defines a method to run after the on entry attribute method completes (i.e., the default value is the actual state being processed). Once an instance of the class schema is created, this attribute is referred to as "value" in the instance of the class schema (instead of "default value"). The max retries attribute defines a maximum number of times to retry the state before exiting, The max time attribute defines a maximum time in, for example, seconds to retry the state before exiting. In some implementations, one or more of the above described attributes may be optional for each state in the state machine.

In one implementation, invocation of the VM retirement state machine 115 by the automation component 109 may be triggered by either a scheduled event or a manual event (e.g., via user interface (UI) of management platform 108). In one implementation, the scheduled and/or manual events that trigger invocation of the VM retirement state machine 115 may be referred to as VM retirement events. A VM retirement event is signal indicating that a retirement process for a VM should begin. The VM retirement state machine 115 exposes many stages of the VM retirement process by adding a new event: request_vm_retire event, which invokes the VM retirement state machine 115 functionality by the automation component 109. As discussed above, the request_vm_retire event may be a scheduled event and/or a manually-requested event in the management platform 108. In addition, the VM retirement state machine 115 adds a VM retirement state attribute 245 for each managed VM in the management platform 108. The VM retirement state attribute 245 may be part of VM data maintained by the management platform 108 in a virtual management data store 240. The VM retirement state attribute 245 allows for better tracking and error detection associated with retirement of the VM. In one implementation, the VM retirement state attribute 245 can be in 3 states: retiring, retired, or error. The VM retirement state attribute 245 helps address the issue encountered with previous solutions of multiple conflicting retirement states.

Figure 3:
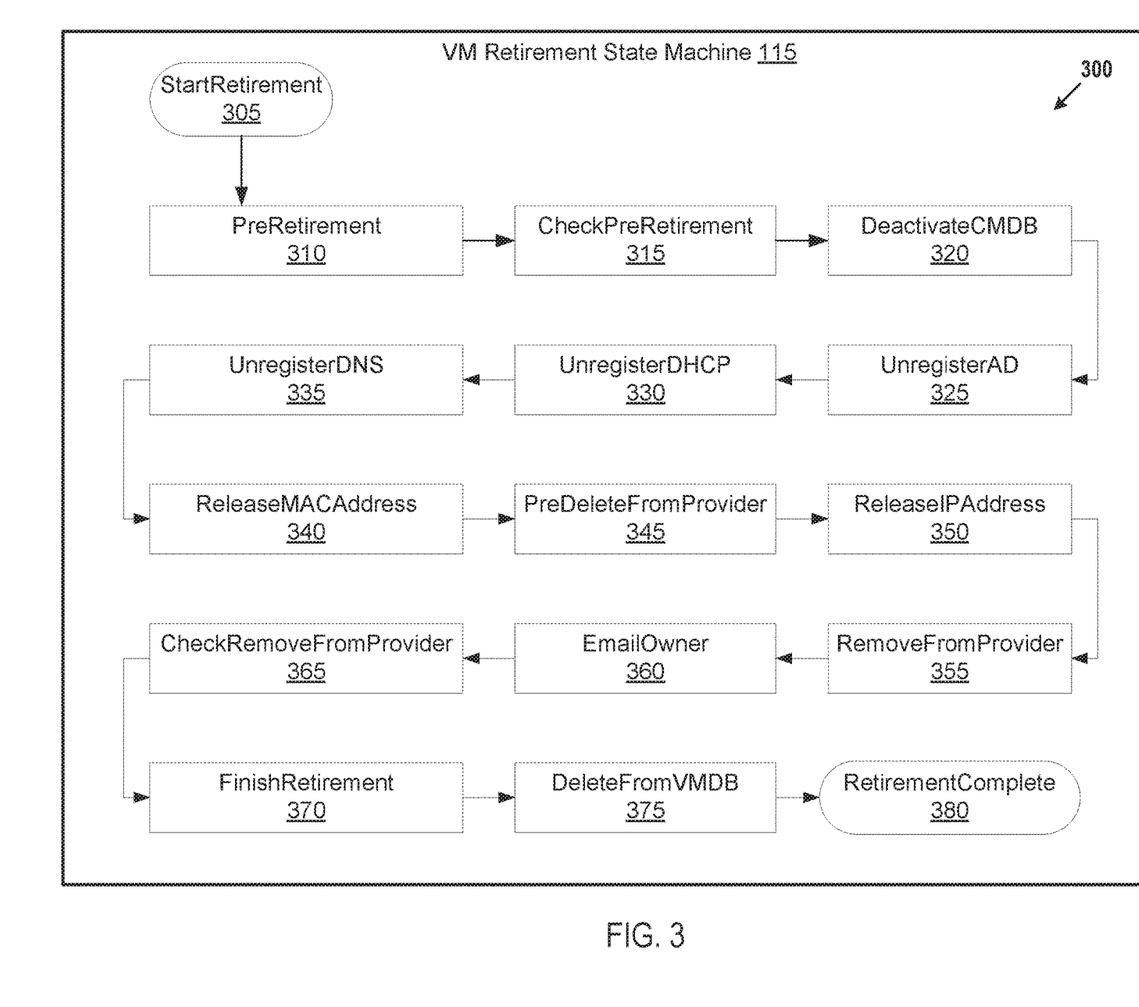
FIG. 3 is a block diagram that shows an example class schema of a virtual machine (VM) retirement state machine.

An example class schema 300 of a VM retirement state machine 115 of implementations of the disclosure is further depicted in FIG. 3. The example class schema 300 includes a sequence of states 305-380 of the VM retirement state machine 115 described with respect to FIGS. 1 and 2. Although depicted in a particular order with respect to class schema 300, the sequence of states 305-380 for the VM retirement state machine 115 may vary depending on each particular implementation of the VM retirement state machine 115, and is not intended to be limited to the exact states 305-380 and sequencing described with respect to FIG. 3.

Class schema 300 for VM retirement state machine 115 begins at the start retirement state 305 when the request_vm_retire event triggers invocation of the VM retirement state machine 115. The start retirement state 305 may perform checks to ensure that the VM is eligible for retirement. In addition, once the eligibility requirements are satisfied, the start retirement state 305 may cause the VM retirement state attribute 245 corresponding to the retiring VM to be set to "retiring".

The pre-retirement state 310 may also prepare the VM to be in the correct state for retirement. The correct sate of retirement is a vendor-specific state and may include a "paused" state or a "stopped" state. The automation component 109 may maintain a set of configurations per VM vendor that indicates the VM state for retirement.

In addition, the pre-retirement state 310 may be a user-configurable state, such that the user may inject (e.g., introduce additional or supplemental code to modify original state) their own behaviors at this state 310. For example, the user (e.g., a customer of management platform 108) may inject code that runs a scan to read files of the VM to identify specific files such as registry keys or serial numbers that represent licenses that the user does not want to lose. Other behaviors at the pre-retirement state 310 may include removing a reference to the VM from a load balancer configuration, delaying retirement workflow execution for a configurable time period, and/or identifying network items that the VM should be un-registered from. These are just a small number of examples, and any type of behavior the user envisions can be configured for execution at the pre-retirement state 310. Because of the nature of the state machine, customization of the VM retirement state machine 115, such as the pre-retirement state 310, allows the user to introduce their own criteria to cancel out of the VM retirement process if desired. For example, the user could introduce criteria to determine whether the VM is a domain controller and, if so, to cancel out of the VM retirement state machine (e.g., set error state).

The check pre-retirement state 315 may performs checks to ensure that any customized code introduced by the customer did not change the eligibility of the VM for retirement. States 320 through 340 are states performing preparatory work to ready the VM for retirement, such as, when applicable, deactivating the VM from a configuration management database (CMDB) 320, unregistering the VM from unregistering the VM from AD 325, unregistering the VM from dynamic host control protocol (DHCP) configurations, unregistering the VM from domain name system (DNS) 335, and releasing the medium access control (MAC) address of the VM 340.

The pre-delete from provider state 345 enables the user to inject customizable code in preparation for removing the VM from the underlying VM provider system. The release Internet Protocol (IP) address state 350 removes the VM's IP address from networking configurations.

The remove from provider state 355 causes the actual removal of the VM to occur. In one implementation, the provider does not handle the retirement of a VM, the VM is either added or removed from a provider. Instead, the management platform handles VM retirement. Different options are available for retirement of VM based on the provider of the VM and preferences of the customer. For example, a VM may be deleted entirely, or unregistered (which leaves the data files associated with the VM still in existence). An email owner state 360 sends a notification to the owner of the VM informing them of the VM's removal from the provider. Check remove from provider state 365 provides additional checks to confirm the VM was successfully retired. Finish retirement state 370 sets a VM retired flag in the management platform 108, sets the VM retirement state attribute 245 for the VM to "retired", raises a VM retired event, and also an audit event. The delete from VMDB (VM database) state 375 is an optional state that allows the VM to be removed from the management platform 108 virtual management data store 240 if the user prefers. This allows users to re-use the name of a VM, and so on. At retirement complete state 280, the VM retirement state machine workflow process is finished.

Figure 4:
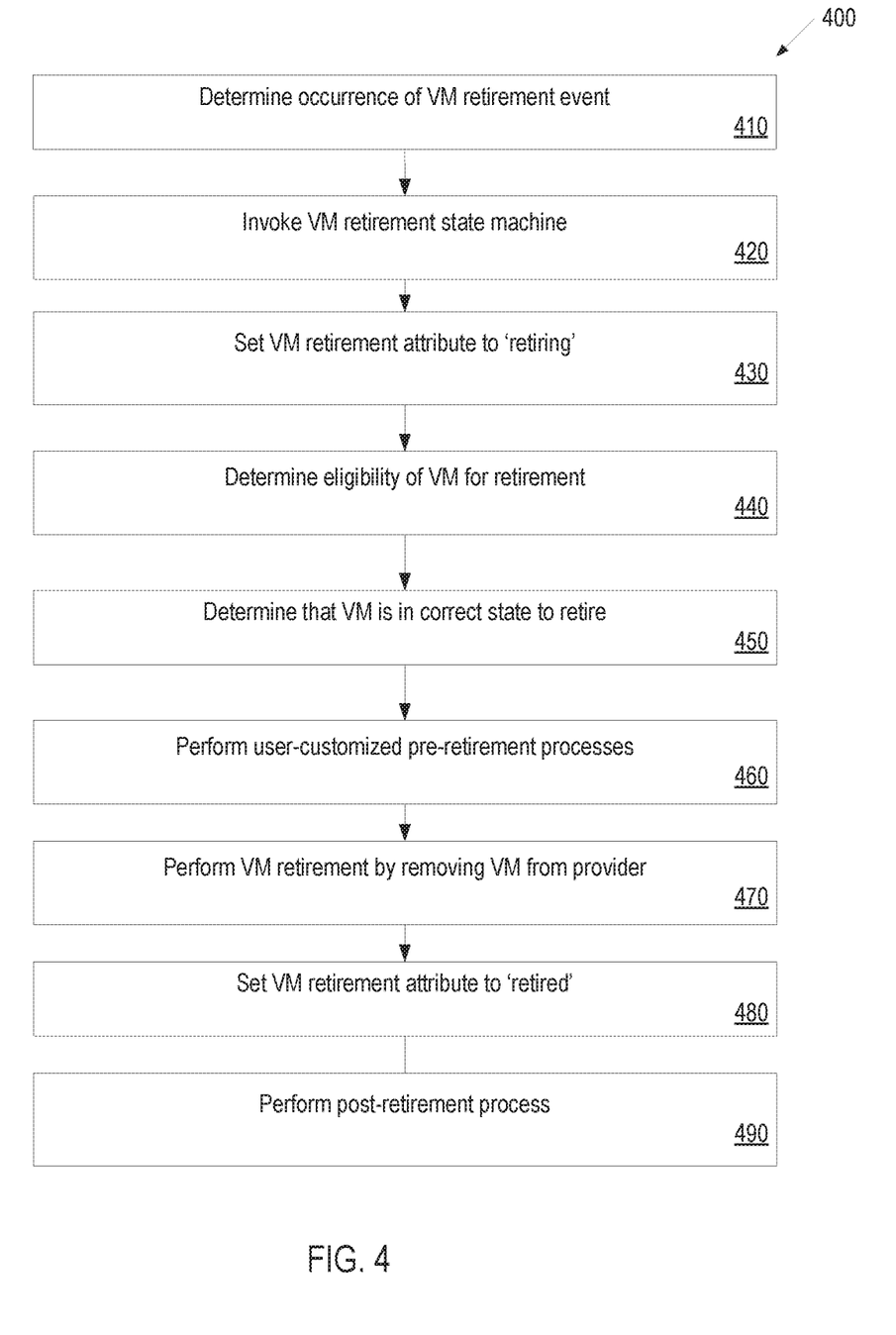
FIG. 4 is flow chart that shows an example of a process for customizable virtual machine retirement in a management platform architecture.

FIG. 4 is a flow diagram for a method 400 for customizable VM retirement in a management platform, in accordance with one or more implementations of the present disclosure. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by an automation component (e.g., automation component 109 of FIG. 1) executed by a processing device in a computing machine. At least a portion of method 400 can be performed automatically by the computing machine without user interaction.

At block 410, the processing device determines than a VM retirement event has occurred. A VM retirement event may be a signal indicating that a retirement process for a VM should begin. Then, at block 420, a VM retirement state machine is invoked. At block 430, a VM retirement attribute is set to 'retiring'. A VM retirement attribute may also be referred to herein as a VM retirement state attribute. The VM retirement attribute may be part of VM data maintained by the management platform and allows for better tracking and error detection associated with retirement of the VM. In one implementation, the VM retirement attribute can be in 3 states: retiring, retired, or error. The VM retirement attribute helps address the issue encountered with previous solutions of multiple conflicting retirement states. Then, at block 440, eligibility of the VM for retirement is determined. At block 450, it is determined that the VM is in a correct state to retire.

Subsequently, at block 460, user-customized pre-retirement processes, if any, are performed. User-customized pre-retirement processes may be end user-defined additional or supplemental code used to introduce the user's own customized behaviors during a retirement process of the VM. For example, the user (e.g., a customer of management platform) may inject code that runs a scan to read files of the VM to identify specific files such as registry keys or serial numbers that represent licenses that the user does not want to lose. Other user-customized pre-retirement processes may include removing a reference to the VM from a load balancer configuration, delaying retirement workflow execution for a configurable time period, and/or identifying network items that the VM should be un-registered from. These are just a small number of examples, and any type of behavior the user envisions can be configured for execution during the VM retirement process. At block 470, retirement of the VM is performed by removing the VM from its underlying provider. At block 480, the VM retirement attribute is set to 'retired'. Lastly, at block 490, post-retirement processes are performed.

If an error state occurs at any of the blocks 430-490, the VM retirement state machine is exited and the VM retirement workflow process is canceled.

Figure 5:
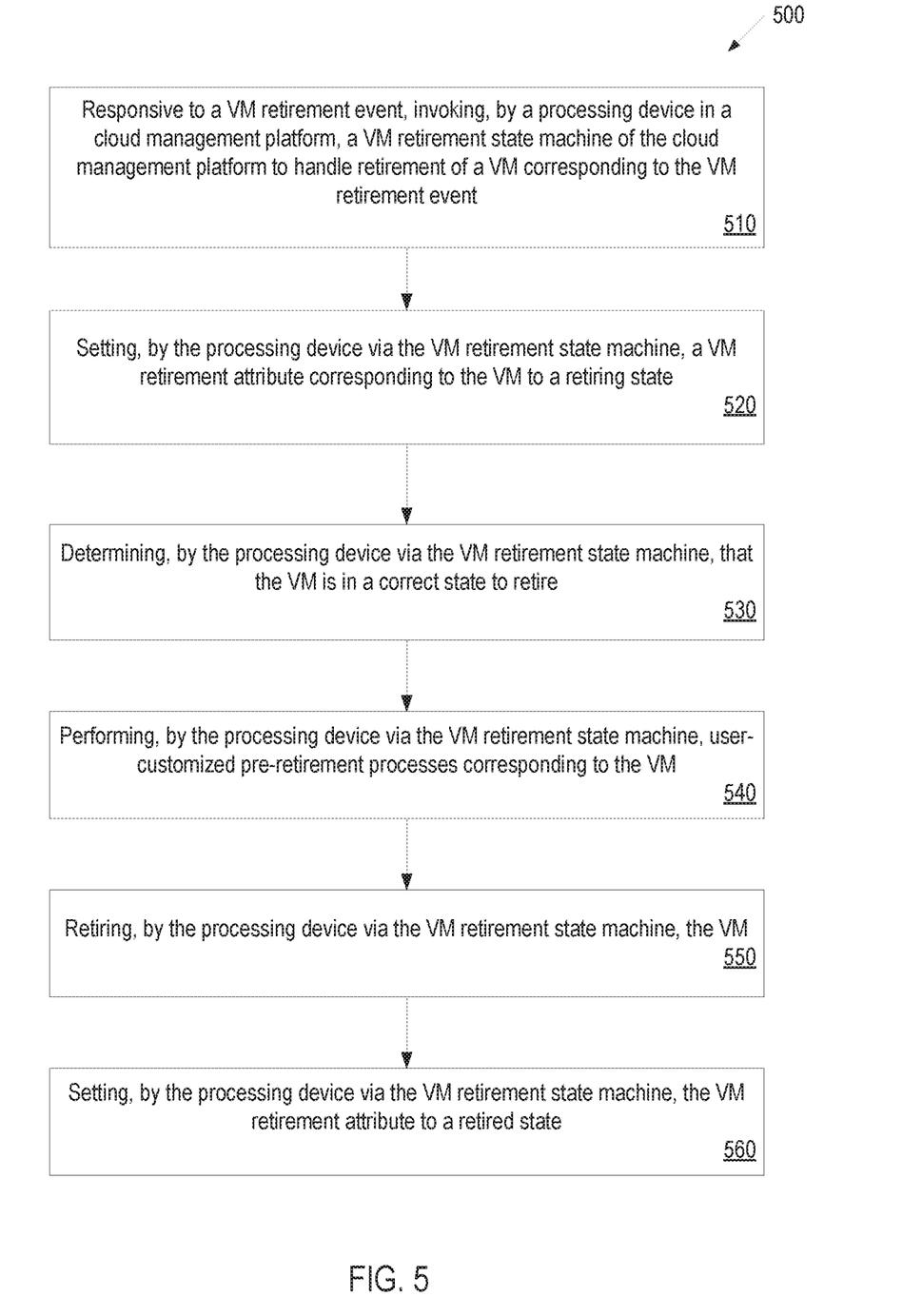
FIG. 5 is flow chart that shows an example of another process for customizable virtual machine retirement in a management platform architecture.

FIG. 5 is a flow diagram for another method 500 for customizable VM retirement in a management platform, in accordance with one or more implementations of the present disclosure. Method 500 can be performed by processing logic that can comprise hardware (e.g., circuitry, dedicated logic, programmable logic, microcode, etc.), software (e.g., instructions run on a processing device), or a combination thereof. In one implementation, method 500 is performed by an automation component (e.g., automation component 109 of FIG. 1) executed by a processing device in a computing machine. At least a portion of method 500 can be performed automatically by the computing machine without user interaction.

At block 510, responsive to occurrence of a VM retirement event, a processing device in a management platform invokes a VM retirement state machine of the management platform to handle retirement of a VM corresponding to the VM retirement event. At block 520, the processing device sets, via the VM retirement state machine, a VM retirement attribute corresponding to the VM to a retiring state. Then, at block 530, the processing device determines, via the VM retirement state machine, that the VM is in a correct state to retire. At block 540, the processing device performs, via the VM retirement state machine, user-customized pre-retirement processes corresponding to the VM. As discussed above, user-customized pre-retirement processes may be end user-defined additional or supplemental code used to introduce the user's own customized behaviors during a retirement process of the VM. For example, the user (e.g., a customer of management platform) may inject code that runs a scan to read files of the VM to identify specific files such as registry keys or serial numbers that represent licenses that the user does not want to lose. Other user-customized pre-retirement processes may include removing a reference to the VM from a load balancer configuration, delaying retirement workflow execution for a configurable time period, and/or identifying network items that the VM should be un-registered from. These are just a small number of examples, and any type of behavior the user envisions can be configured for execution during the VM retirement process.

Subsequently, at block 550, the processing device retires, via the VM retirement state machine, the VM. Lastly, at block 560, the processing device sets, via the VM retirement state machine, the VM retirement attribute to a retired state. The retired state reflects that the VM retirement process has completed and the VM has been completely shut down and unregistered from the host and/or host controller.

Figure 6:
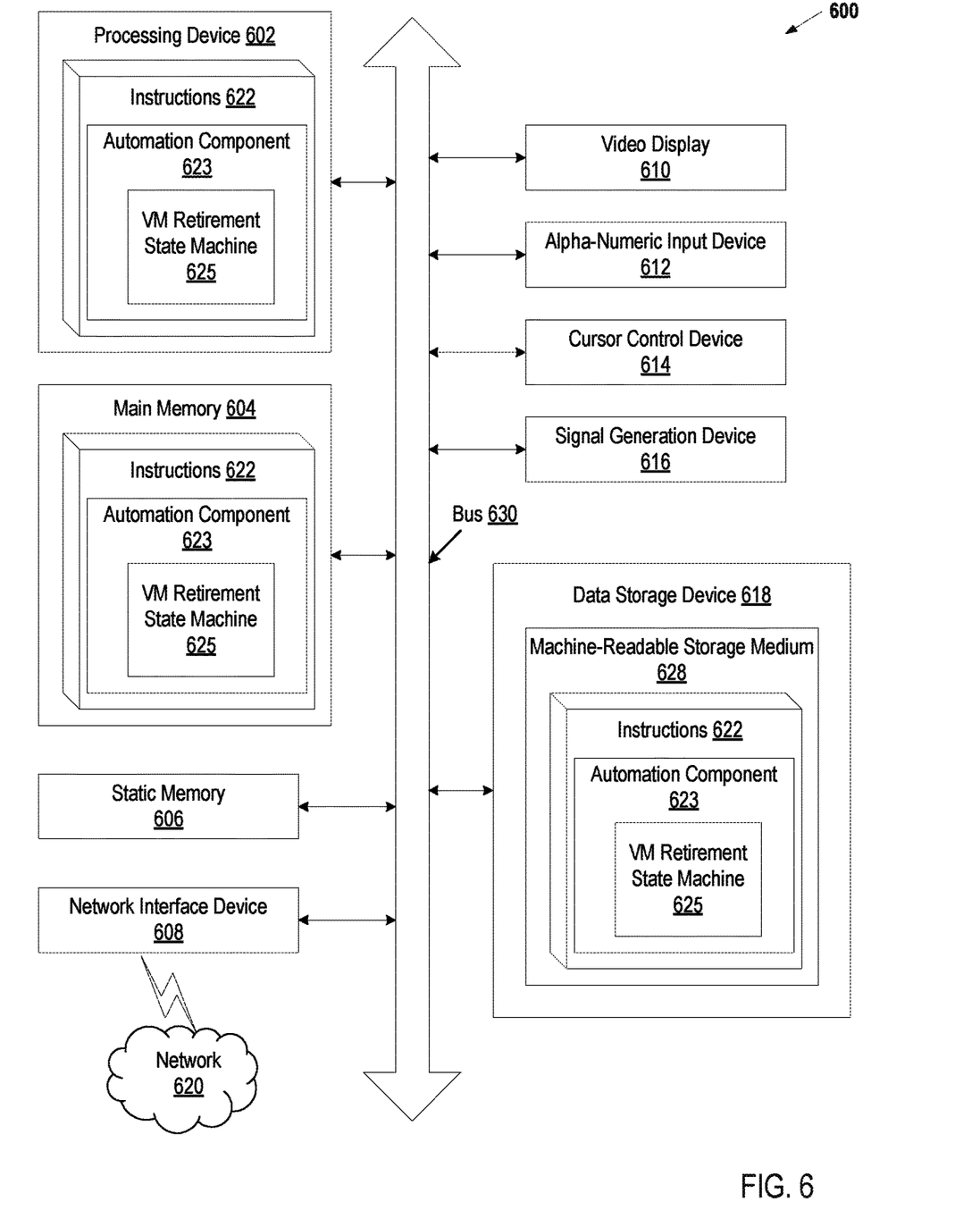
FIG. 6 is a schematic diagram that shows an example of a computing system.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data store device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT), an alphanumeric input device 612 (e.g., a keyboard), a cursor control device 614 (e.g., a mouse), and a signal generation device 616 (e.g., speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for an automation component 623 including a VM retirement state machine 625 (e.g., automation component 109 and VM retirement state machine 115, respectively, of FIG. 1), and/or a software library containing methods that call the automation component 623 and/or VM retirement state machine 625. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   responsive to occurrence of a virtual machine (VM) retirement event, invoking, by a processing device in a management platform, a VM retirement state machine of the management platform to handle retirement of a VM corresponding to the VM retirement event;
   setting, by the processing device via the VM retirement state machine, a VM retirement attribute corresponding to the VM to a retiring state;
   determining, by the processing device via the VM retirement state machine, that the VM is in a correct state to retire;
   identifying user-customized pre-retirement processes that correspond to the VM, the user-customized pre-retirement processes defined by user-provided code to customize a pre-retirement state of the VM retirement state machine, wherein the user-customized pre-retirement processes comprise delaying a retirement workflow for a configurable time period, identifying network configurations from which to unregister the VM, and removing a reference to the VM from a load balancer configuration;
   responsive to determining that the VM is in the correct state to retire, executing, by the processing device via the VM retirement state machine, the pre-retirement state of the VM retirement state machine comprising the user-customized pre-retirement processes corresponding to the VM, wherein executing the pre-retirement state comprises at least:
      identifying the configurable time period corresponding to a delay of the retirement workflow;
      delaying the retirement workflow for the configurable time period; and resuming the retirement workflow responsive to the configurable time period lapsing;

subsequent to executing the pre-retirement state of the VM retirement state machine, retiring, by the processing device via the VM retirement state machine, the VM; and setting, by the processing device via the VM retirement state machine, the VM retirement attribute to a retired state.

2. The method of claim 1, wherein the VM retirement event is at least one of a scheduled retirement of the VM or a manual retirement of the VM requested by an owner of the VM via a user interface (UI) of the management platform.

3. The method of claim 1, wherein the VM retirement state machine is part of an automation component of the management platform.

4. The method of claim 1, wherein the correct state to retire comprises at least one of a paused state or a stopped state and is dictated by an underlying provider of the VM to the management platform.

5. The method of claim 1, wherein the user-customized pre-retirement processes further comprise running a scan to read files of the VM to identify specific files.

6. The method of claim 1, further comprising performing, via the VM retirement state machine, post-retirement processes corresponding to the VM.

7. The method of claim 6, wherein the post-retirement processes comprise removing the VM from a virtual management data store of the management platform.

8. The method of claim 1, wherein the VM retirement state machine comprises a plurality of states representing processes of retirement of the VM, and wherein the VM retirement state machine cancels the retirement of the VM when one of the plurality of states results in an error.

9. A non-transitory computer-readable medium having instructions stored therein that, when executed by a processing device, cause the processing device to:
  determine, by the processing device in a management platform, that a virtual machine (VM) retirement event has occurred;
  invoke a VM retirement state machine to handle retirement of the VM corresponding to the VM retirement event;
  update, by the processing device, a VM retirement attribute corresponding to the VM to a retiring state;
  determine, by the processing device via the VM retirement state machine, that the VM is in a correct state to retire;
  identify user-customized pre-retirement processes that correspond to the VM, the user-customized pre-retirement processes defined by user-provided code to customize a pre-retirement state of the VM retirement state machine, wherein the user-customized pre-retirement processes comprise delaying a retirement workflow for a configurable time period, identifying network configurations from which to unregister the VM, and removing a reference to the VM from a load balancer configuration;
  responsive to determining that the VM is in the correct state to retire, execute, by the processing device via the VM retirement state machine, the pre-retirement state of the VM retirement state machine comprising the user-customized pre-retirement processes corresponding to the VM, wherein executing the pre-retirement state comprises at least:
    identifying the configurable time period corresponding to a delay of the retirement workflow;
    delaying the retirement workflow for the configurable time period; and
    resuming the retirement workflow responsive to the configurable time period sing;
  subsequent to executing the pre-retirement state of the VM retirement state machine, retire, by the processing device via the VM retirement state machine, the VM; and
  update, by the processing device via the VM retirement state machine, the VM retirement attribute to a retired state.

10. The non-transitory computer-readable medium of claim 9, wherein the VM retirement event is at least one of a scheduled retirement of the VM or a manual retirement of the VM requested by an owner of the VM via a user interface (UI) of the management platform.

11. The non-transitory computer-readable medium of claim 9, wherein the VM retirement state machine is part of an automation component of the management platform.

12. The non-transitory computer-readable medium of claim 9, wherein the correct state to retire comprises at least one of a paused state or a stopped state and is dictated by an underlying provider of the VM to the management platform.

13. The non-transitory computer-readable medium of claim 9, wherein the user-customized pre-retirement processes further comprise running a scan to read files of the VM to identify specific files configuration, or delaying retirement of the VM for a configurable time period.

14. The non-transitory computer-readable medium of claim 9, wherein the processing device is further to perform, via the VM retirement state machine, post-retirement processes corresponding to the VM, wherein the post-retirement processes comprise removing the VM from a virtual management data store of the management platform.

15. The non-transitory computer-readable medium of claim 9, wherein the VM retirement state machine comprises a plurality of states representing processes of retirement of the VM, and wherein the VM retirement state machine cancels the retirement of the VM when one of the plurality of states results in an error.

16. A system comprising:
  a memory to store an inventory tree for a management platform; and
  a processing device communicably coupled to the memory, the processing device to:
    responsive to occurrence of a virtual machine (VM) retirement event, invoke a VM retirement state machine of the management platform to handle retirement of a VM corresponding to the VM retirement event;
    set, via the VM retirement state machine, a VM retirement attribute corresponding to the VM to a retiring state;
    assess, via the VM retirement state machine, eligibility of the VM for retirement;
    identify user-customized pre-retirement processes that correspond to the VM, the user-customized pre-retirement processes defined by user-provided code to customize a pre-retirement state of the VM retirement state machine, wherein the user-customized pre-retirement processes comprise delaying a retirement workflow for a configurable time period, identifying network configurations from which to unregister the VM, and removing a reference to the VM from a load balancer configuration;
    responsive to determining that the VM is eligible for retirement, execute, via the VM retirement state machine, the pre-retirement state of the VM retirement state machine comprising the user-customized pre-retirement processes for the VM, wherein executing the pre-retirement state comprises at least:
    identifying the configurable time period corresponding to a delay of the retirement workflow;
    delaying the retirement workflow for the configurable time period; and
    resuming the retirement workflow responsive to the configurable time period lapsing;
subsequent to executing the pre-retirement state of the VM retirement state machine, cause, via the VM retirement state machine, the VM to be removed from a provider of the VM; and
set, via the VM retirement state machine, the VM retirement attribute to a retired state.

17. The system of claim 16, wherein the VM retirement state machine is part of an automation component of the management platform.

18. The system of claim 16, wherein the correct state to retire comprises at least one of a paused state or a stopped state and is dictated by an underlying provider of the VM to the management platform.

19. The system of claim 16, wherein the user-customized pre-retirement processes further comprise running a scan to read files of the VM to identify specific files.

20. The system of claim 16, wherein the VM retirement state machine comprises a plurality of states representing processes of retirement of the VM, and wherein the VM retirement state machine cancels the retirement of the VM when one of the plurality of states results in an error.

* * * * *